(12) United States Patent
Blanchard et al.

(10) Patent No.: US 9,172,197 B2
(45) Date of Patent: Oct. 27, 2015

(54) METHOD OF ASSEMBLING AN AIRCRAFT

(71) Applicant: AIRBUS OPERATIONS LIMITED, Bristol (GB)

(72) Inventors: Jack Blanchard, Bristol (GB); Gavin Richard Williams, Bristol (GB); Andrew Gollin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/210,404

(22) Filed: Mar. 13, 2014

(65) Prior Publication Data

US 2014/0190007 A1    Jul. 10, 2014

Related U.S. Application Data

(62) Division of application No. 13/024,600, filed on Feb. 10, 2011, now Pat. No. 8,702,448.

(30) Foreign Application Priority Data

Feb. 23, 2010  (GB) .................................. 1002996.5

(51) Int. Cl.
*H01R 43/00* (2006.01)
*H05K 13/00* (2006.01)
*H01R 43/18* (2006.01)
*B64C 1/10* (2006.01)
*H01R 13/52* (2006.01)
*H01R 13/533* (2006.01)

(52) U.S. Cl.
CPC *H01R 43/18* (2013.01); *B64C 1/10* (2013.01); *H01R 13/521* (2013.01); *H01R 13/533* (2013.01); *Y10T 29/49002* (2015.01); *Y10T 29/49174* (2015.01)

(58) Field of Classification Search
CPC ............ B64C 1/06; B64C 1/10; B64D 15/16; Y10T 29/49002; Y10T 29/49174
USPC ........ 29/854, 428, 592.1, 857, 874, 876, 884; 244/1 R, 119, 120, 131, 139; 439/272, 439/345, 544, 559
See application file for complete search history.

(56) References Cited

U.S. PATENT DOCUMENTS

| | | | |
|---|---|---|---|
| 2,656,203 A * | 10/1953 | Musser .......................... 403/11 |
| 4,591,114 A | 5/1986 | Block | |
| 4,684,190 A | 8/1987 | Clark et al. | |
| 4,909,760 A | 3/1990 | O'Keefe, II et al. | |
| 4,921,437 A | 5/1990 | Cooper et al. | |
| 5,009,374 A * | 4/1991 | Manfredi et al. ............. 244/1 R |
| 5,618,204 A | 4/1997 | Nix et al. | |
| 5,803,763 A | 9/1998 | Grant | |

FOREIGN PATENT DOCUMENTS

WO    2006051229    5/2006

OTHER PUBLICATIONS

UK Search Report for GB1002996.5 mailed Jun. 3, 2010.

* cited by examiner

*Primary Examiner* — Thiem Phan
(74) *Attorney, Agent, or Firm* — Hauptman & Ham, LLP

(57) ABSTRACT

An aircraft pressure bulkhead electrical connector comprising a first connection terminal proximate at least one side of the electrical connector and a pressure seal arranged to maintain an applied air pressure differential across the electrical connector in use.

12 Claims, 2 Drawing Sheets

METHOD OF ASSEMBLING AN AIRCRAFT

RELATED APPLICATIONS

The present application is a Divisional of U.S. application Ser. No. 13/024,600, filed on Feb. 10, 2011, and claims priority to British Application Number 1002996.5, filed Feb. 23, 2010, the disclosures of which are hereby incorporated by reference herein in their entirety.

The present invention concerns an electrical connector. More specifically, the present invention concerns an aircraft pressure bulkhead electrical connector.

Aircraft fuselages are pressurised to allow the occupants to travel in comfort and safety. The aircraft wings are generally not pressurised, and the interior space of the wing adopts the ambient pressure, which at altitude is significantly less than the pressure inside the fuselage.

It is desirable to route electrical cables between the aircraft interior and the wing interior. Such cables may be generator cables which carry power from the engines to the fuselage systems, or control signal cables which carry control signals from the onboard computer and aircraft controls to the engines and various actuators and controls mounted to the wings.

In known systems such cables are routed through the boundary between the fuselage and the wing interior (the fuselage wall). This is achieved by passing the cables through a rubber pressure bung which fits into a bore in the fuselage wall. The pressure bung grips the cable and is gripped within the bore such that a pressure differential between the wing interior and the fuselage is maintained. Once the cables have passed into the fuselage, they are routed to a terminal block.

A problem with such systems is that aircraft wings are often supplied as sub-assemblies. The various cables must protrude from the fuselage side of the wing by a distance sufficient to route them through the pressure bungs and to the terminal block within the aircraft fuselage. The various cables are therefore exposed until the wing is attached to the fuselage. This means that they are exposed to external forces and elements and may be damaged before the wing can be assembled to the fuselage.

Further, in order to transport the assembled wing, the various protruding cables are temporarily attached to a wing outer surface (e.g. the upper surface). This is not ideal, as cables of this type are not designed to experience the curvature that this requires, and there is a risk of damage as a result.

The protruding cables also require a great deal of manipulation to feed them through the fuselage wall via the pressure bungs which is time consuming and potentially damaging to the cables.

It is an object of the present invention to provide an improved electrical connection.

According to a first aspect of the present invention there is provided an aircraft pressure bulkhead electrical connector comprising a first connection terminal proximate at least one side of the electrical connector and a pressure seal arranged to maintain an applied air pressure differential across the electrical connector in use.

The aircraft pressure bulkhead electrical connector may comprise a connector interface module comprising the first connection terminal, in which the connector interface module is embedded in a connector body.

The aircraft pressure bulkhead electrical connector may comprise a plurality of adjacent connection terminals.

The aircraft pressure bulkhead electrical connector may comprise a connection terminal proximate a second side of the electrical connector.

According to a second aspect of the invention there is also provided an aircraft pressure bulkhead comprising an electrical connector in accordance with the first aspect installed therethrough wherein the electrical connector is sealed to the bulkhead with the pressure seal to maintain an applied air pressure differential across the bulkhead in use.

According to a third aspect of the invention there is also provided an aircraft fuselage comprising a pressure bulkhead according to the second aspect wherein the first connection terminal faces outwardly from the fuselage at a position configured to interface with an aircraft wing.

According to a fourth aspect of the invention there is provided a method of assembling an aircraft comprising the steps of:

providing an aircraft fuselage having a fuselage wall, providing an electrical connector in the fuselage wall, the connector having a connection terminal facing outwardly from the fuselage, providing a wing assembly comprising an electrical cable, connecting the electrical cable to the connection terminal, and, assembling the wing to the fuselage over the connection terminal.

According to the invention there is also provided an aircraft pressure bulkhead electrical connector as described herein with reference to or in accordance with the accompanying drawings.

An example electrical connector in accordance with the present invention will now be described with reference to the accompanying drawings in which.

Figure 1:
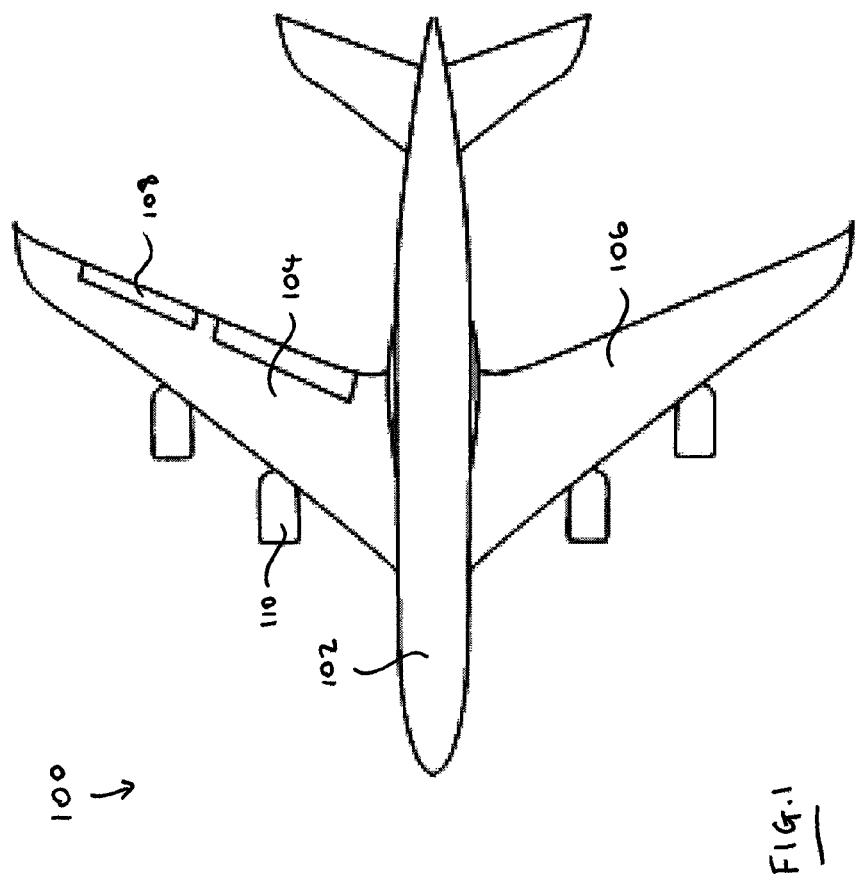
FIG. 1 is a plan view of an aircraft.

Referring to FIG. 1, a passenger aircraft 100 comprises a fuselage 102, a first wing 104 and a second wing 106. When at altitude, the fuselage 102 is pressurised to an air pressure level that is comfortable for the occupants within. This pressure is significantly higher than the ambient pressure at a typical passenger aircraft cruising altitude.

During assembly of the aircraft 100 it is necessary for various cables to be routed from the exterior to the interior of the fuselage 102. Such cables may be generator cable for the transfer of power to the fuselage, or signal cables for the transfer of control signals to the various wing mounted systems (e.g. a control surface 108 or an engine 110).

Figure 2:
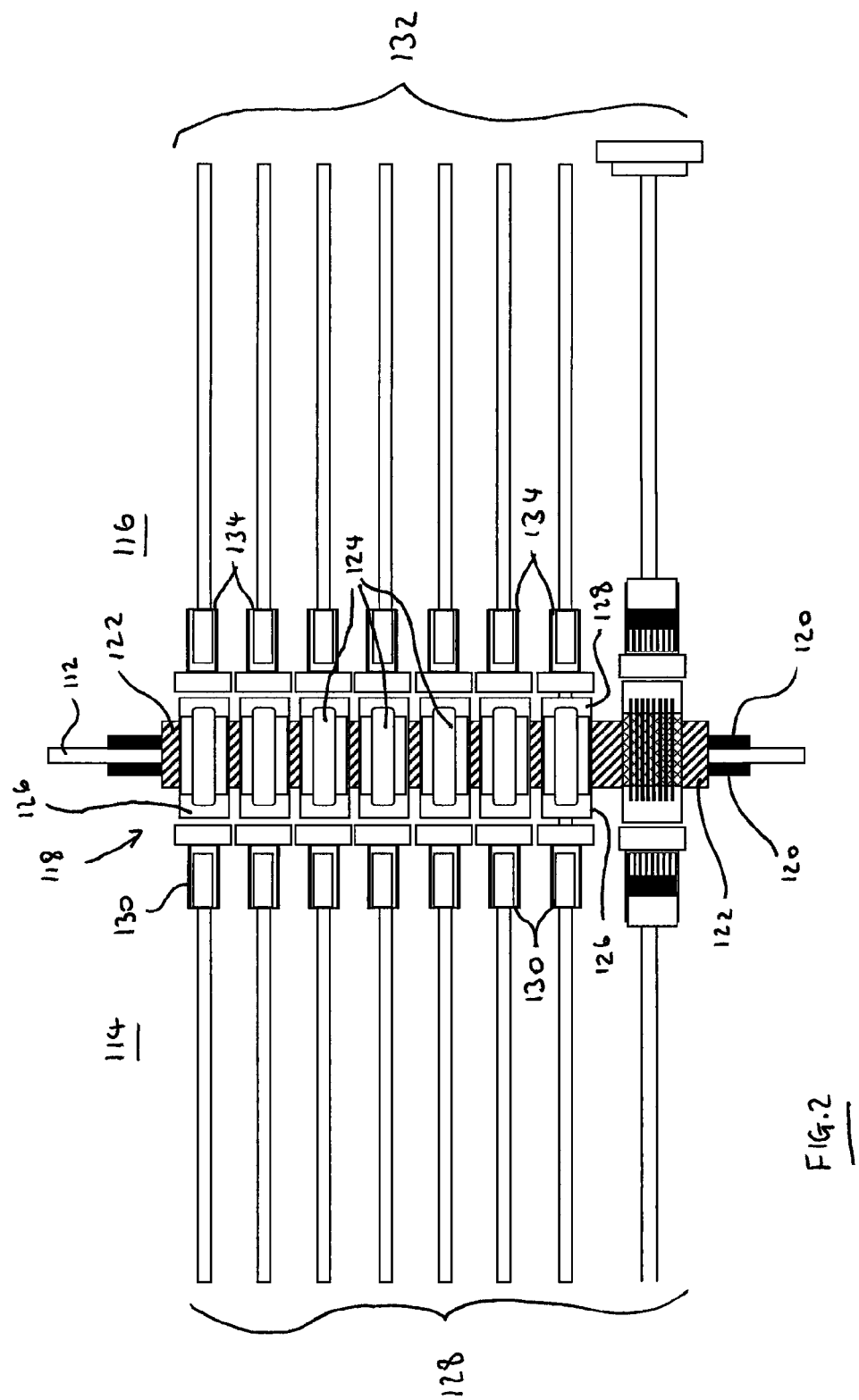
FIG. 2 is a plan section view of an aircraft pressure bulkhead electrical connector in accordance with the present invention.

Referring to FIG. 2, a pressure bulkhead 112 is shown which is formed from part of the fuselage wall. The pressure bulkhead 112 delimits an interior space 114 of the fuselage 110 and a wing space 116 within the wing 104. The interior space 114 is pressurised whereas the wing space 116 is at ambient pressure. Therefore during flight there is a pressure differential across the bulkhead 112.

An electrical connector 118 is provided within the bulkhead 112. The electrical connector 118 comprises a pair of main plates 120 secured either side of the bulkhead 112. A connector body 122 sits within an orifice in the bulkhead 112, and is held in position by the main plates 120. The connector body 122 is a semi-flexible sealing material capable of holding an airtight seal against metal.

A plurality of connector interface modules 124 are sealed within the connector body 122. Each connector interface 124 has a first connection terminal 126 and a second connector terminal 128 comprising a number of electrical contacts (not visible). The corresponding electrical contacts of each terminal 126, 128 are in electrical connection across the connector interface 124.

The connector interface modules 124 are arranged such that the first terminal 126 projects on the interior space 114 and the second terminal projects towards the wing space 116.

The main plates 120, the body 122 and the modules 124 are all sealed such that a pressure differential across the bulkhead 112 may be maintained—i.e. the connector 118 is airtight.

When the aircraft is assembled, once the connector 118 is installed, a series of interior electrical cables 128 can be connected to the first connection terminals 126 via a series of plugs 130. The connector 118 therefore leaves a series of exposed second terminals 128 ready for connection.

When the aircraft wing 108 is installed, the wing subassembly need only carry a series of wing cables 132 sufficiently long to reach the fuselage 102 and to engage the second terminals 126 projecting therefrom with a series of plugs 134.

Therefore wing assembly is made much simpler, as long cables are not required to be passed through rubber sealing bungs in the bulkhead.

Variations on the above embodiment are envisaged to fall within the scope of the present invention.

The interior side of the connector may not comprise terminals, but may be directly connected to cables routed inside the fuselage.

The system may be modular in nature. Specifically, the electrical connector may comprise a carrier or frame sealed to the aircraft fuselage which defines a plurality of bores to receive various types of different connection terminals. The individual connection terminals are sealed to the frame or carrier. Each individual connection terminal may be constructed from two parts attachable from each side of the carrier to grip and seal against the carrier in use. The individual connection terminals may be removable such that they can be replaced.

The invention claimed is:

1. A method of assembling an aircraft comprising the steps of:
    providing an aircraft fuselage having a fuselage wall,
    providing an electrical connector in the fuselage wall, the connector having a first connection terminal facing outwardly from the fuselage,
    providing a wing assembly comprising an electrical cable,
    connecting the electrical cable to the connection terminal, and,
    assembling the wing to the fuselage over the connection terminal.

2. The method according to claim 1, in which the electrical connector comprises a pressure seal arranged to maintain an applied air pressure differential across the electrical connector in use.

3. The method according to claim 2, in which:
    the electrical connector comprises a connector interface module comprising the first connection terminal, in which the connector interface module is sealed in a connector body.

4. The method according to claim 3, in which:
    the connector body comprises a semi-flexible sealing material.

5. The method according to claim 3 in which the connector interface module comprises a first part and a second part which seal the connector body therebetween.

6. The method according to claim 3 in which the terminal module is removably mounted to the connector body.

7. The method according to claim 2, in which:
    the electrical connector comprises a plurality of connection terminals,
    the method comprising the steps of:
    providing a wing assembly comprising a plurality of electrical cables,
    connecting each of the electrical cables to a respective connection terminal, and,
    assembling the wing to the fuselage over the connection terminals.

8. The method according to claim 7, in which:
    the electrical connector comprises a connector body comprising the pressure seal and a plurality of connector interface modules each comprising a connection terminal,
    in which the terminal modules are sealed in the connector body.

9. The method according to claim 8, in which:
    the connector body comprises a semi-flexible sealing material between the terminal modules.

10. The method according to claim 2 wherein the electrical connector is sealed to the bulkhead with the pressure seal to maintain an applied air pressure differential across the bulkhead in use.

11. The method according to claim 1, in which:
    the fuselage comprises an electrical cable; and,
    the electrical connector comprises a connection terminal facing into the fuselage;
    the method comprising the steps of:
    connecting the electrical cable of the fuselage to the connection terminal facing into the fuselage.

12. The method of assembling an aircraft comprising the steps of:
    providing an aircraft fuselage having a fuselage wall,
    providing an aircraft pressure bulkhead electrical connector in the fuselage wall, the connector comprising:
        a connector body constructed from a semi-flexible material and sealing within an orifice in the fuselage wall, the connector body forming a pressure seal to maintain pressure across the fuselage wall in use;
        a plurality of separate connector interface modules sealed within the connector body, each connector interface module comprising a first connection terminal facing inwardly of the fuselage, and a second connection terminal facing outwardly of the fuselage, each connection terminal being configured to be connected to a separate electrical cable;
    providing a wing assembly comprising an electrical cable,
    connecting the electrical cable to the second connection terminal, and,
    assembling the wing to the fuselage over the second connection terminal.

* * * * *